Oct. 31, 1933.   W. G. BAMBRIDGE   1,933,405
SCREW THREADING MACHINE
Filed April 2, 1931   6 Sheets-Sheet 1

INVENTOR
William Gems Bambridge
by Connolly Bros.
Attys

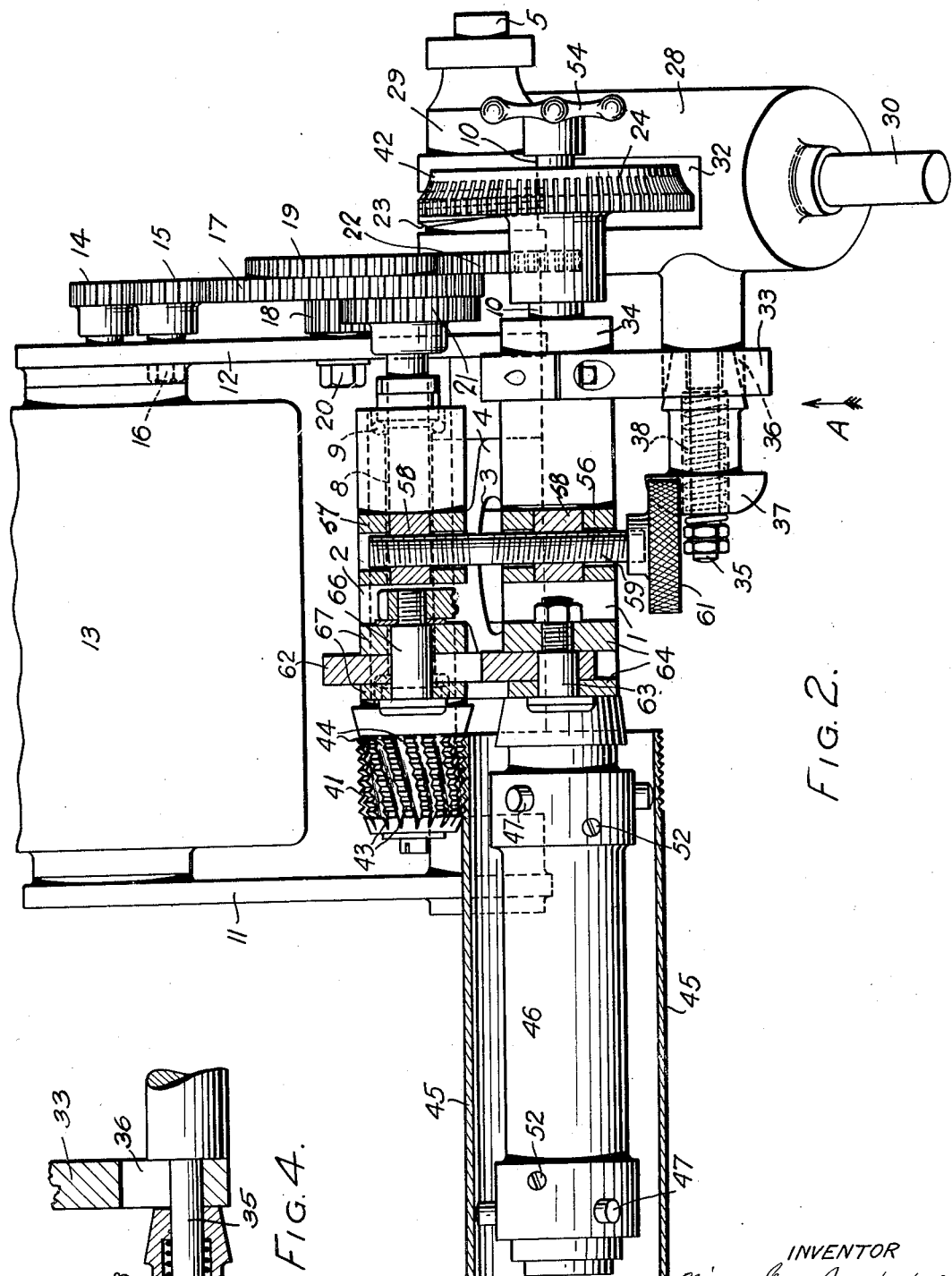

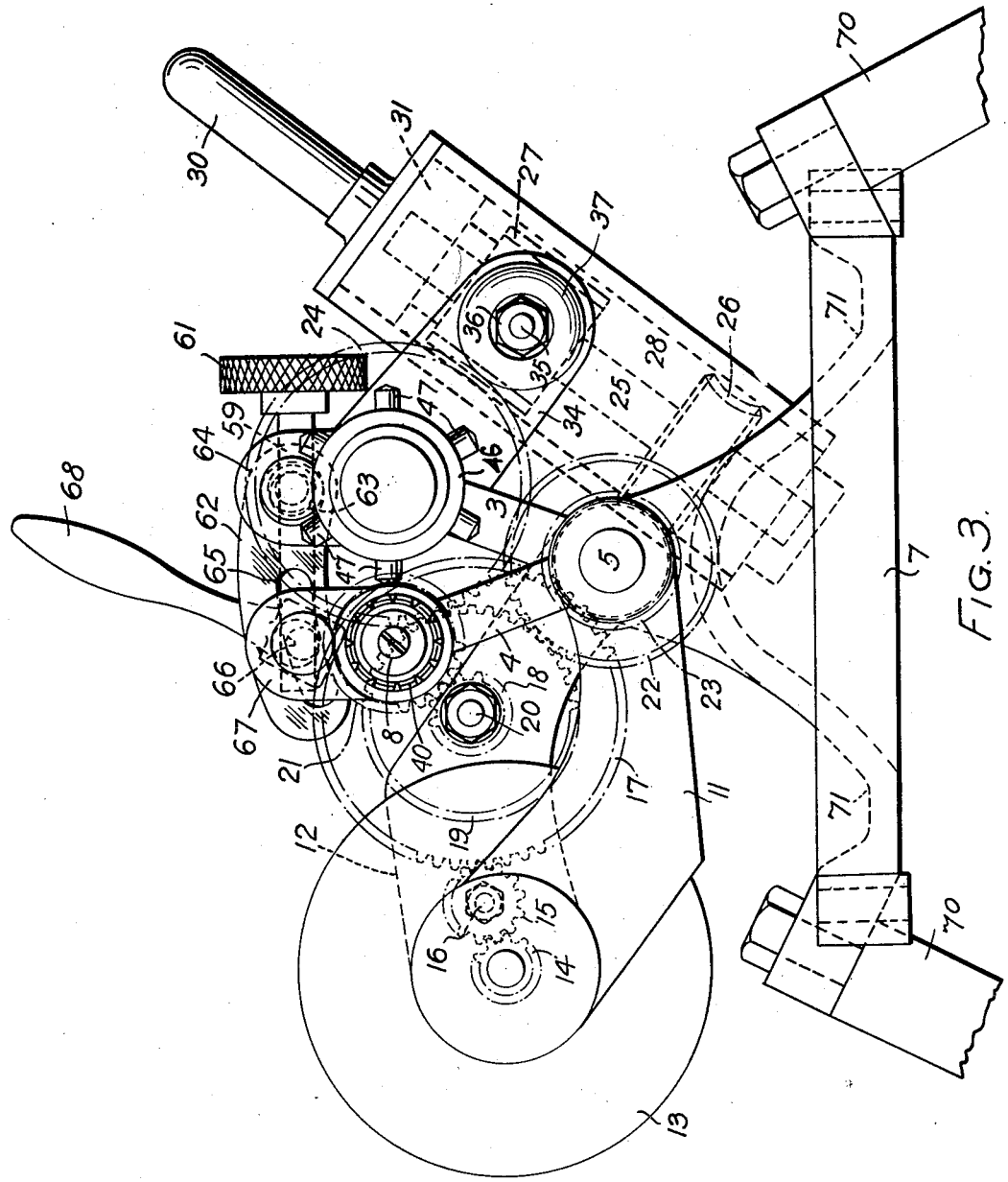

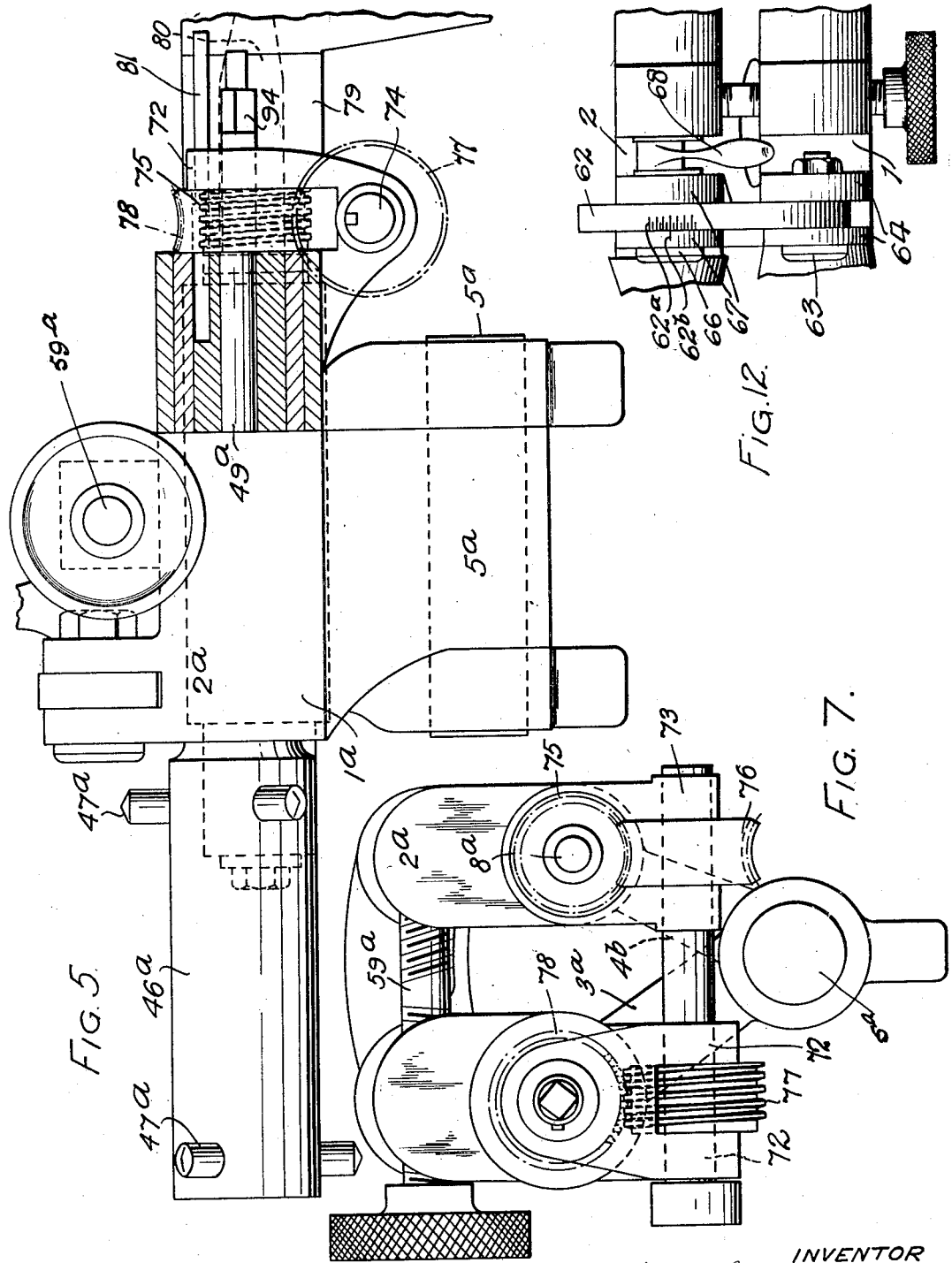

Oct. 31, 1933.  W. G. BAMBRIDGE  1,933,405
SCREW THREADING MACHINE
Filed April 2, 1931   6 Sheets-Sheet 5
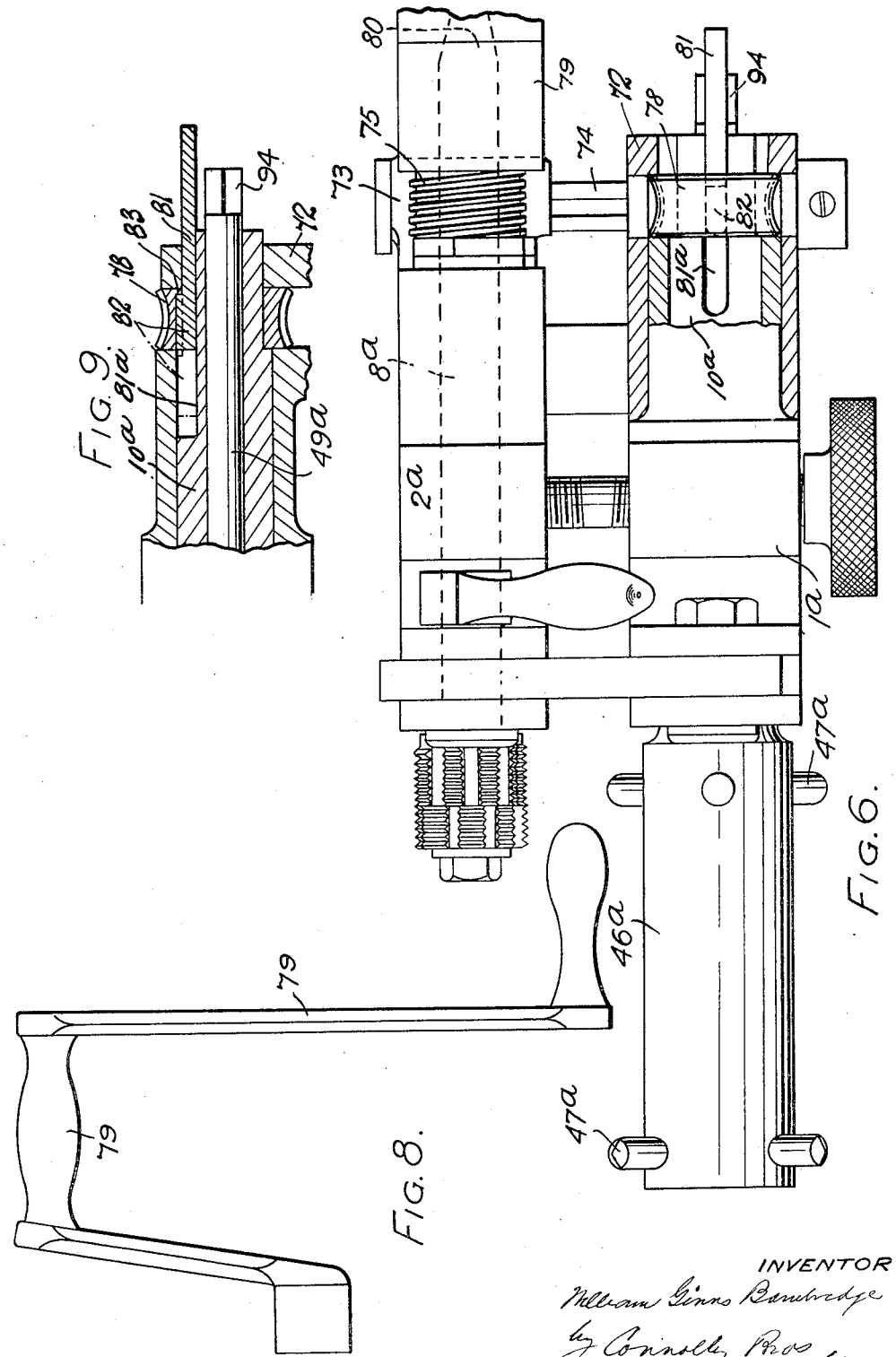
INVENTOR
William Ginns Bambridge
by Connolly Bros
Attys Patented Oct. 31, 1933

1,933,405

UNITED STATES PATENT OFFICE 1,933,405

SCREW THREADING MACHINE

William Ginns Bambridge, Kettering, England, assignor to The Spiro Ball Bearing Company Limited, Kettering, England, a company of Great Britain Application April 2, 1931, Serial No. 527,281, and in Great Britain May 12, 1930

3 Claims. (Cl. 10—154)

This invention relates to screwing machines and concerns more especially though not exclusively machines for screw-threading metal pipes and tubes externally.

The main object I have in view is to provide an efficient screwing machine of a simple and compact form capable of easy operation by one person with or without power for screwing pipes and tubes of various sizes including the larger sizes, and which can be made in portable form.

In the machine to be described the operation is performed by what is known as thread milling. That is to say the screw thread is formed by means of a rotary milling cutter.

The invention consists of a screwing machine features of which will be pointed out in the further following description and indicated in the claims appended thereto.

In order that my invention may be clearly and readily understood I will now describe by way of example some practical embodiments thereof in the form of machines which are mainly intended for externally threading metal pipes although it is to be understood that such description is not to be regarded as limitative in this connection as some of the features to be described may be embodied in machines for screw-threading other kinds of work.

In the following further description reference will be made to the accompanying drawings wherein Figure 1 is a side elevation, partly in section, Figure 2 is a plan, partly in section, and Figure 3 is an end elevation of one example of the invention in the form of a machine adapted to be driven by power.

Figure 4 shows in section a locking device as viewed in the direction of arrow A in Figure 2.

Figure 5 is a side elevation,

Figure 6 is a plan, and

Figure 7 is an end elevation of another example of the invention in the form of a machine intended to be operated by hand.

Figure 8 shows a suitable handle for operating this machine.

Figure 9 is a sectional view of a clutch device hereinafter particularly referred to.

Figure 12 is plan view of a coupling between the supporting members for the cutter shaft and work spindle and the provision for facilitating adjustment thereof.

Figure 1:
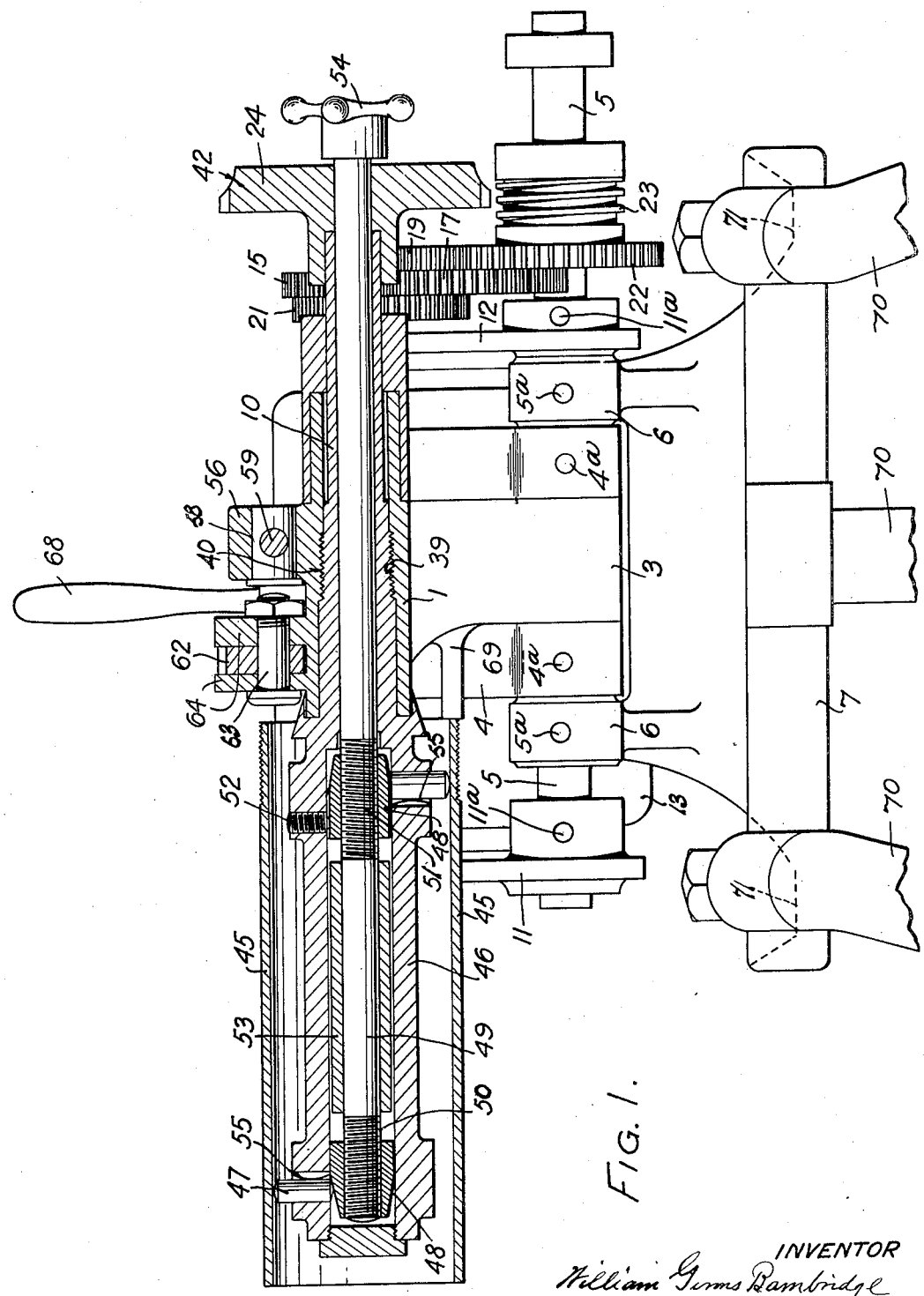

According to the embodiment illustrated in Figures 1 to 3 the machine has two bearings 1, 2 arranged side by side in parallel or substantially parallel relation, said bearings being formed respectively on webs or frames 3, 4 which are pivotally connected by a common axle or rod 5 fixed in lugs 6 on a base or stand 7 e. g. by taper pins 5a. The web or frame 4 is secured to the rod 5 e. g. by taper pins 4a, the arrangement being such that the bearings 1, 2 are capable of relative lateral movement without disturbing their parallelism.

One bearing contains a rotatable cutter shaft 8 which is furnished with ball thrust and journal bearings 9, while the other bearing carries a rotatable and axially movable carrier spindle 10.

The cutter shaft 8 is adapted to be driven in a suitable manner by power and transmission means whereby the carrier spindle is rotated at a big reduction, and an appropriate form of such means which constitutes a novel feature of my invention will now be described.

Referring to Figures 2 and 3, the aforesaid axle or rod 5 has fixed thereon at the ends e. g. by taper pins 11a, arms 11, 12 which carry between them an electric motor 13 on the armature shaft of which is a driving pinion 14. This pinion meshes with an idler pinion 15 freely mounted on a stud 16 fixed in the adjacent arm 12. Meshing with the pinion 15 is a gear 17 having on one side thereof a pinion 18 and on the other side a gear 19, the whole being mounted on another stud 20 also fixed in the arm 12. The cutter shaft 8 has secured thereon a gear 21 which meshes with the pinion 18, and freely mounted on the axle or rod 5 is a gear 22 which has associated therewith a worm 23 and meshes with the gear 19. The carrier spindle 10 has fast thereon a worm wheel 24 and this is driven from the worm 23 through the medium of an intermediate shaft 25 furnished with a worm wheel 26 and a worm 27 meshing respectively with the worm 23 and the worm wheel 24, said shaft being mounted by means of anti-friction bearings, in a housing 28 pivoted at one end by means of lugs 29 on the axle or rod 5 so that by rocking the housing the worm 27 can be engaged with and disengaged from the worm wheel 24 and the spindle 10 started or stopped accordingly. The housing is furnished with a handle 30 conveniently formed with a part 31 which serves to support the shaft 25 at one end, and is removable from the housing 28 for convenience in assembling and disconnecting the component parts. The housing is furnished with openings 32 to enable the worm wheel 26 and the worm 27 to mesh with the worm 23 and wheel 24. Normally the worm 27 is disengaged from the worm wheel 24, the disengagement being brought about by allowing the housing 28 to swing down about its pivot 5 under the combined weight of the housing and the parts carried thereby, the downward movement being limited by means of an arm 33 clipped on to a collar 34 constituting an extension of the bearing 1, and a pin 35 extending laterally from the housing through a hole 36 in the arm. To start the spindle 10, the housing is lifted by means of the handle 30 and I provide locking means to maintain the housing in this position when the handle 30 is released. Conveniently the locking means comprise a plunger 37 slidable on the pin 35, said plunger being tapered at one end for entrance into the hole 36 and urged towards the arm by a spring 38. With the housing in the inoperative position, the tapered end of the plunger 37 abuts against the opposing side of the arm 33, as shown in Figure 4. When the housing is lifted to start the spindle 10, the plunger is urged into the hole 36 as shown in Figure 2 by the spring 38 and thus automatically locks the housing in the operative position. To stop the spindle 10 the plunger is withdrawn by hand against the spring action and the housing falls as aforesaid.

To impart the requisite feed the carrier spindle 10 has a screw-threaded part 39 which engages with a nut 40 in the bearing 1. This nut has threads the same number per inch as those to be formed upon the work. Consequently as the carrier spindle 10 rotates within its bearing 1 it will, by means of the threaded parts 39, 40, be shifted endwise correspondingly to move the work in relation to the cutter 41 thereby enabling the latter to produce the required helical thread. The worm wheel 24 is fast on the spindle 10 and therefore is bevelled on one side i. e. at 42 automatically to clear the driving worm 27 after the desired length of thread has been cut, and thus stop the feed to prevent the wheel from jamming up against the opposing end of the collar 34.

To enable the machine to be used in cases where the number of threads per inch varies, I may construct the bearing 1 to take interchangeable nuts or equivalent devices and I may provide different spindles or a spindle having a threaded part which is interchangeable with others. For example for the interchangeable nuts the bearing may have a gap into which the nuts would be inserted and the spindle may have a threaded sleeve fitting on to a key or feather on the carrier spindle.

In most cases it is sufficient to permit the carrier spindle 10 to make one complete revolution to form the thread all round the work. It may however make more than one complete turn. It will be understood that the milling cutter 41 used when the full length of the threaded part on the work is to be made by one complete revolution of the work is of a length equal to the desired length of the threaded part. The said cutter is of course made with the cutting threads 43 spaced thereon at the required pitch and with lengthwise extending gaps 44 to provide the cutting edges.

After the formation of the desired threaded parts on one piece of work, such as a tube 45, the carrier spindle may be turned backwards by hand to return it to normal position preparatory to the next feed movement, for which purpose the housing 28 is allowed to drop as previously explained herein.

For carrying the tube to be screwed the carrier spindle 10 has beyond its bearing a cylindrical body 46 adapted to enter the bore of the tube as shown in Figures 1 and 2. Fitting slidably in radial holes in this cylindrical body are pins 47 the inner ends of which engage with inclined or conical members movable axially within the body by a screwed rod whereby the pins are projected to grip the tube and can be allowed to contract to release it. Preferably there are two series of these radial pins, one series at each end of the cylindrical body, those of one series being staggered in relation to those of the other series. This arrangement enables the end of the pipe or tube which is to be screwed to be held in a firm and concentric manner in the machine.

For operating the radial pins in the two series there is provided in the hollow interior of the body a pair of conical collars 48. Passing centrally through the carrier spindle is a rod 49 having right and left screw-threaded parts 50, 51 each engaging one of the cone collars. Each collar is prevented from turning within the body by a screw 52 with a reduced end which enters a groove in the roller, the latter being thereby free to slide when the said rod is rotated. The collars when so actuated move towards or away from each other according to the direction in which the rod is turned and either push the pins outwards to grip the pipe or tube or allow them to move radially inwards to release the work. An intermediate limit sleeve 53 is used to prevent the collars 48 from moving to an extent which would permit the pins to drop off the small ends of the cones. For operation by hand the rod projects from one end of the carrier spindle and is furnished with a knobbed hand wheel 54.

The radial pins are removable and are interchangeable with others of different length for holding tubes of different sizes. The pins may be capable of sufficient projection under the action of the cones to take tubes of two or more sizes. The pins may be frictionally held from displacement when in use in the body for which purpose a spring such as 55 may be furnished in each of the holes.

The cutter 41 on the cutter shaft 8 opposes laterally the carrier body at the inner end thereof as shown in Figure 2 so that when a tube is in position on the latter the cutter can be caused to operate upon the adjacent side of the pipe by relative approach of the bearings 1 and 2.

For obtaining the relative movement of the bearings I prefer to use a rotary screw connection wherein the bearings 1 and 2 are formed with lugs 56, 57 in which cylindrical blocks 58 tapped diametrically respectively right and left hand are inserted loosely for the reception of a rod 59 having right and left screw-threaded portions and a knurled head 61 for operating it. The purpose of the blocks 58 is of course to permit of the relative pivotal movement of the bearings when the screwed rod 59 is rotated. Thus the distance between the cutter shaft and the carrier spindle regulated by relative movement of the bearings can be varied for enabling the machine to take tubes of different sizes as well as for regulating the depth of cut.

To facilitate relative adjustment of the bearings and enable the proper depth of cut for different sizes to be readily determined I may provide a gauge or indicator consisting of a quadrant or bar 62, see also Figure 12, marked off into appropriate divisions for example as represented at "62" in Figure 12 said quadrant or bar being pivotally mounted on the bearing 1 by means of an eccentric pin 63 and lugs 64 and furnished with a slot 65 for engagement with a pin 66 fixed in lugs 67 on the other bearing 2, one of which lugs has thereon a zero mark e. g., 62b. The quadrant or bar is pivoted on an eccentric pin so that adjustment can be made to compensate changes in the size of the cutter due to grinding. The bearing 1 may be locked against movement after adjustment by means of a locking handle 68 working on the screwed end of the pin 66 so as to bind upon the adjacent one of the lugs 67 on movement clockwise as viewed in Figure 3.

The work holding device on the carrier spindle may be detachable to be replaced by others for carrying work of different sizes; or I may provide the machine with a removable carrier spindle for the same purpose.

In using the machine thus far described, the tube to be screwed is passed onto the carrier body 46 until the inner end thereof makes contact with a stop such as 69, Figure 1, and then the rod 49 is rotated to project the radial pins 47 which thereupon engage the tube on the inside thereof thereby centralizing it about the carrier body 46 and gripping it. The cutter shaft is then driven by the motor 13 and the intermediate gearing already described, and the rotating milling cutter and work are then brought into contact by operation of the screw 59, the contact between the cutter and work being regulated to obtain the desired depth of cut. The housing 28 is then raised to bring the worm 27 into mesh with the worm wheel 24 for imparting the comparatively slow rotation to the carrier spindle 10 so that the latter is moved endwise i. e. to the left viewing Figures 1 and 2 and the threads are formed round the tube in due course.

The base or stand 7 may be constructed for use on a bench or like support or for the attachment thereto of legs such as 70 for supporting the machine. Said stand is also formed so as to provide a trough 71 to catch water or some other cooling liquid supplied to the cutter and/or work and is provided with a suitable outlet for the escape of the liquid into a receptacle for use over again.

The machines shown in Figures 5 to 11 are furnished respectively with cutter shafts and carrier spindles constructed and arranged in bearings 1a, 2a, in a manner similar to that described with reference to Figures 1 to 3. In these machines however different means are employed for driving the said shafts and spindles.

Figure 10:
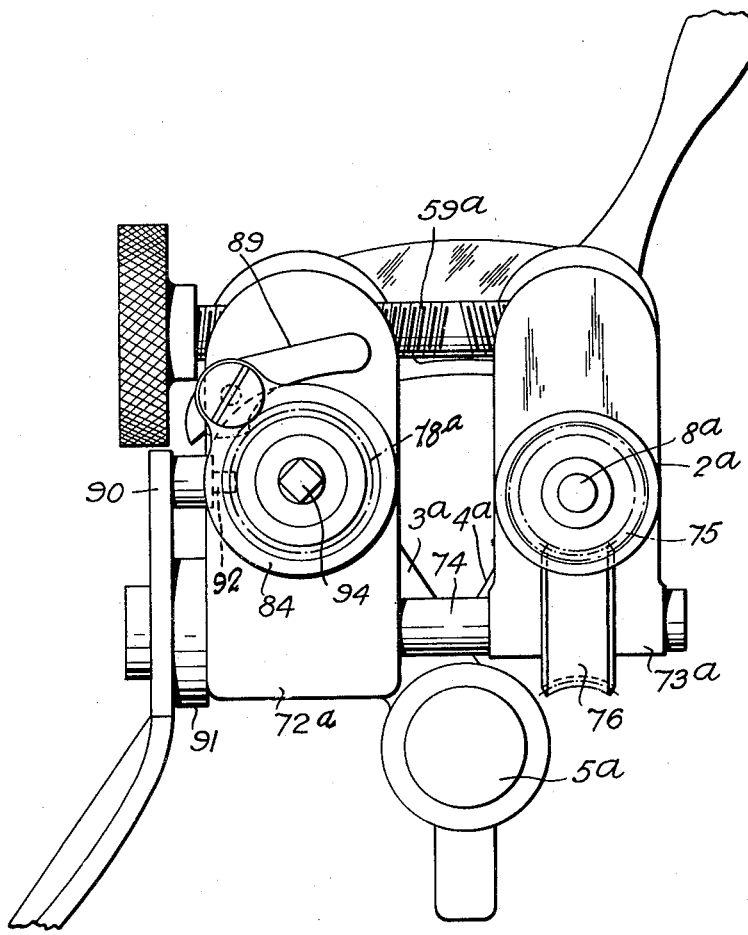
Figures 10 and 11 are respectively an end view and a sectional view of modifications applicable to a machine which in other respects may be similar to that shown in Figures 5 to 7.

On the bearings 1a, 2a respectively are what I will call brackets 72, 73 (Figures 5 to 7) or 72a, 73a, (Figure 10). Each is mounted (e. g. as shown in Figure 5) so as to be capable of turning on its bearing for a purpose hereinafter appearing. Extending from the bracket 72 or 72a to the bracket 73 or 73a is a transverse shaft 74 the opposite ends of which pass through and take a bearing in the said brackets. This transverse shaft is both rotatable and capable of endwise movement in the brackets.

On the cutter shaft 8a is a worm 75 which drives a wormwheel 76 on the transverse shaft 74, this wormwheel being located within the bracket 73 or 73a. On the transverse shaft but situated within the other bracket 72 or 72a is a worm 77 which drives a wormwheel 78, (Figures 5, 6, 7 and 9) or 78a (Figures 10 and 11) on the carrier spindle 10a. The wormwheel 76 and worm 77 on the transverse shaft are feathered to the latter so as to drive and be driven by the same respectively while at the same time the said shaft is free to slide endwise in these members as well as in the brackets.

The transverse shaft is so mounted in the brackets that when the bearings 1a, 2a are moved relatively laterally to vary the distance between them the transverse shaft 74 will preserve parallel or other relation between the brackets while permitting them to move towards or away from each other with the bearings, in which action the said brackets and the gear members therein slide on the transverse shaft and permit the bearings due to their pivotal movement, to turn therein; the brackets do not turn in relation to each other since the transverse shaft functions to prevent such movement.

It will thus be seen that no matter how the space between the bearings is varied in accordance with requirements the transmission means remain unaffected. The double worm and wormwheel arrangement enables a big reduction say for example 200 to 1, to be obtained between the cutter shaft and carrier spindle.

In either of these machines the cutter shaft may be driven by hand e. g. by means of a crank handle 79, see particularly Figure 8, applied to a tapered portion 80 of the said shaft, and the carrier spindle is driven from the cutter shaft through intermediate gearing just described and a movable key, clutch or equivalent of any suitable form. According to the construction shown in Figures 5, 6 and 9, the wormwheel 78 on the carrier spindle is rendered fast and loose by means of a manually operable key 81 slidable in a keyway 81a and having a head 82 which is carried into or out of a keyway 83 in the wormwheel according to the direction in which the key is moved. When the carrier spindle is to be rotated the key is pulled outwards by means of a suitable tool so that as shown in Figure 9 the head enters the keyway 83. To stop rotation and feed movement of the carrier spindle the key is pushed inwards i. e. to the position indicated by dot and dash lines so that the head clears the keyway.

Figure 11:
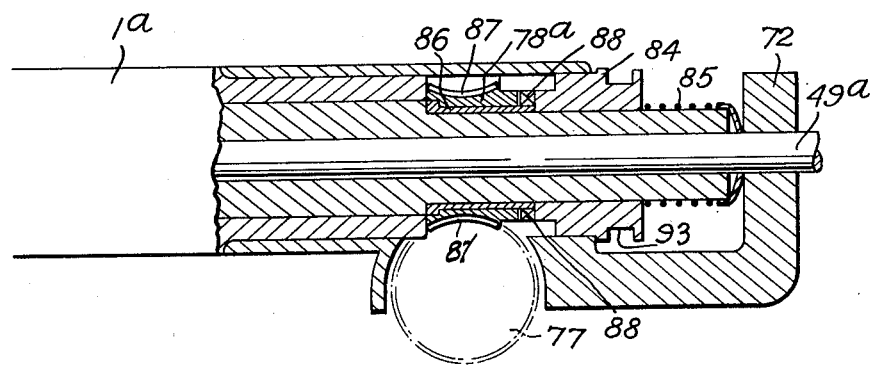

Referring to Figures 10 and 11, the wormwheel 78a on the carrier spindle 10a is free and adapted to be rendered operative for driving purposes by a slidable clutch member 84 adapted under the pressure of a spring 85 to engage with the wormwheel. Conveniently the wormwheel 78a is furnished with a bush 86 and has teeth at one end thereof. The bush fits freely on the spindle 10a. The said clutch member has teeth 88 at one end thereof and drives the spindle by a feather or key being normally held with its teeth disengaged from those of the driven wormwheel by a spring controlled catch 89. When the carrier spindle is to be rotated, the operator moves the catch 89 thereby releasing the clutch member which thereupon engages with the driven wormwheel whereby rotation is transmitted by the latter to the spindle. To stop rotation of the carrier spindle the operator disengages the clutch member from the wormwheel by movement of a lever 90 provided for the purpose, the aforesaid catch thereupon coming into action to hold the clutch member out of action. The lever is pivoted on a boss 91 on the bracket 72a and has a pin 92 therein which enters a groove 93 in the clutch member.

In the two machines described with reference to Figures 5 to 11 the bearings 1a, 2a are carried respectively by webs or frames 3a, 4b pivotally connected by means of an axle or rod 5a about which the relative lateral movement is effected by means of a screwed rod 59a and associated parts in the manner already described with reference to Figures 1 to 3. The carrier spindle 10a is furnished with a work holder 46a fitted with pins 47a for gripping the work. Said pins may be frictionally held in the holes in the carrier without the aid of springs but are projected by means of conical collars operated in the manner previously described herein by means of a screwed rod 49a. This screwed rod may be rotated by means of a knobbed handle, such as 54, but in the form shown has a squared end 94 for engagement by a key.

In using either of the forms of machine described with reference to Figures 5 to 11 one of the webs or frames 3a, 4b or some other suitable part may be held in a vice, particularly when the machine is operated by a crank handle in which case the work revolves, or the work may be held in a vice in which case the machine will slowly revolve around the work as the cutter operates.

It will be understood that the cutter shaft and the carrier spindle may be driven by means of treadle operated gearing instead of by means of a handle such as 79, and that when a clutch is provided this may be operated by a foot lever instead of by a handle such as 90.

To provide ease of operation antifriction bearings may be used for carrying the rotating parts in addition to those provided for the cutter shaft.

The machines described are suitable for dealing with pipes or tubes having an internal diameter which admits of the use of the interior carrier device. For dealing with pipes and tubes of the smaller sizes where the use of an inside chuck or holder is not practicable I may provide a modified construction wherein the rotary carrier spindle has a chuck or other suitable form of holder for gripping the work exteriorly. In this case the said chuck or holder is conveniently of sleeve-like form for passage of the pipe or tube therethrough the sleeve having dogs, jaws or other gripping elements adapted to be relatively contracted for engaging the pipe or tube on the outside to firmly hold it. The sleeve is rotatable in a bearing and is movable endwise for imparting the feed similarly to the aforesaid carrier spindle. In this embodiment the bearing for the sleeve is not located by the side of the cutter shaft bearing but opposes it endwise and is arranged to one side of the cutter shaft so that the cutter and pipe or tube can be brought into lateral contact by relative movement of the bearings. The bearings are preferably pivotally mounted on a common member which in this case may consist of a tubular rocker bar. Since in this form of the machine the driving ends of the cutter shaft and rotary work carrier are remote, the transmission means for the drive may comprise a longitudinal shaft running through the rocker bar said shaft being driven by reduction gear from the cutter shaft at one end and at the other end driving the rotary sleeve by further reduction gear. The reduction gears are preferably of the worm and wormwheel type. Relative adjustment of the bearings is effected in a similar manner to that already described.

While the hereindescribed embodiments of the invention are mainly intended for screw threading the ends of tubular work such as metal pipes and tubes, the machines may however be adapted for other purposes such, for example, as screwing studs, bolts and other articles or stock.

It will be understood that in the use of a machine furnished with a base or stand or intended to be held in a vice by means of one of the bearing members the carrier spindle supports the work and rotates same in relation to the cutter while in the case of a machine intended for use with the work held in a vice the carrier spindle supports the whole machine and that in operation the latter revolves around the work since the carrier spindle is held stationary by reason of its grip upon the work.

The invention provides a machine capable of dealing with a wide range of pipes and tubes e. g. ranging from 2 to 8 inches in diameter but nevertheless of a particularly compact and light construction, in comparison with machines in which slides are used, due to the arrangement of the supporting members in the manner set forth herein. Further the arrangement provides rigidity and obviates looseness and play usually incident to the use of slides while the compact and light character of the machine is conducive to portability.

What I claim then is:—

1. A machine for screwing pipes and the like bodies comprising a rotary cutter shaft, a rotatable and axially movable work spindle, supporting members for the cutter shaft and the work spindle respectively, a carrier bar common to both supporting members and on which said members are mounted in divergent angular relation, means operable to effect relative angular adjustment of the supporting members on their carrier bar, brackets carried pivotally by the supporting members, a transverse shaft capable of both rotation and endwise movement in the said brackets, gears on said transverse shaft, gears on the cutting shaft and work spindle respectively meshing with the gears on the transverse shaft, and means for imparting feed movement axially to the work spindle.

2. A machine for screwing pipes and like bodies, comprising members pivotally connected by a carrier bar common to both, a cutter shaft supported by one member and a work spindle supported by the other member, parallel to the cutter shaft, means connecting the supporting members and operable to effect relative angular adjustment thereof on their carrier bar, means for holding said members relatively rigid after adjustment, brackets carried pivotally by the supporting members, a transverse shaft capable of both rotation and endwise movement in the said brackets, gears on said transverse shaft, gears on the cutting shaft and work spindle respectively, meshing with the gears on the transverse shaft, and means for imparting axial movement to the work spindle to feed the work in relation to the cutter.

3. In a screwing machine of the character described, comprising a base structure, a rotary cutter shaft and a work spindle capable of relative feed movement axially, a pair of shaft bearing members by which said shaft and spindle are rotatably carried, a fixed carrier bar mounted on said base structure, upon which the said members are mounted in juxtaposed position, and from which said members extend upwardly in angular divergent relation, said members being relatively adjustable through movement in the arc of a circle described from the axial center of said carrier bar to vary the distance apart of the cutter shaft and work spindle.

WILLIAM GINNS BAMBRIDGE.